2,745,837
BENZHYDRYL ETHERS OF ALKYL PIPERIDINOLS

Domenick Papa and Stephen B. Coan, Bloomfield, N. J., assignors to Schering Corporation, Bloomfield, N. J., a corporation of New Jersey No Drawing. Application January 21, 1954,
Serial No. 405,495

5 Claims. (Cl. 260—294.7)

This invention relates to a new group of compounds which have therapeutic properties. More particularly this invention relates to benzhydryl ethers and thioethers of alkylated piperidines and their non-toxic acid addition and quaternary salts.

The compounds of the present invention may be represented by the following general formula:

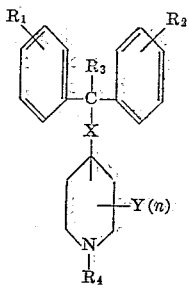

I wherein $R_1$ and $R_2$ are members of the group comprising hydrogen, halogen, lower alkyl and lower alkoxy radicals, $R_3$ represents H and lower alkyl; $R_4$ is a member of the group comprising lower alkyl and monocyclic aralkyl, X is a member of the group consisting of O and S, Y is a lower alkyl group and $n$ is an integer from 1–4.

We have found that the compounds of this invention, which unlike many compounds in clinical use, exhibit prolonged antihistamine effect as well as substantial anticholinergic properties. Furthermore, we have found that these compounds exhibit a marked enhancement of action in inhibiting gastro-intestinal motility and also possess anesthetic properties. These properties are exhibited to a greater degree by the free bases and the acid-addition salts thereof, with the ethers of the 4-piperidinols being most active.

The compounds of this invention may generally be prepared by reacting a piperidinol with a benzhydryl halide in the presence of a basic catalyst and if desired, an inert solvent such as toluene or xylene. Specifically, when benzhydryl bromide is refluxed with 1,2,2,6-tetramethyl-4-piperidinol in anhydrous xylene in the presence of anhydrous potassium carbonate, there is obtained the benzhydryl ether of 1,2,2,6-tetramethyl-4-piperidinol.

Although the compounds of our invention may be prepared by simply heating the desired reactants together until the desired ether is obtained, we prefer to carry out the reaction in the presence of some inert solvent such as an aliphatic or aromatic hydrocarbon or high boiling ether. The particular solvent is not critical since its primary purpose is to permit more efficient interaction of the reactants. Thus any unreactive solvent having a boiling point above 80° may be employed.

In this reaction, a mole of hydrohalic acid is liberated and since it may precipitate the ether or even some unreacted basic alcohol, we prefer to employ an acid acceptor such as pyridine, dialkylanilines or as shown above, inorganic bases such as sodium or potassium carbonate. Alternatively, an excess of basic alcohol may be used to neutralize the hydrogen halide released. In those cases wherein the basic alcohol is liquid at the reaction temperature, it may be employed as solvent.

The reaction is preferably carried out more or less under anhydrous conditions in order to realize more favorable yields; therefore it is preferable to employ only substantially anhydrous reactants and solvents.

In addition to the foregoing, the appropriate piperidinol may be alkylated with a suitable benzhydryl halide in liquid ammonia solvent using an alkali metal amide as catalyst. For example, reacting 1,2,6-trimethyl-4-piperidinol with p-chlorobenzhydryl-chloride in liquid ammonia in the presence of sodamide, yields 1,2,6-trimethyl-4-piperidyl p-chlorobenzhydryl ether.

The intermediate alkylated piperidinols are easily prepared by methods well known to those skilled in the art. According to Campbell et al. J. Org. Chem. 15, 337 (1950) γ-pyrones react with ammonia and alkyl amines to give the analogous pyridone which, upon reduction with hydrogen at elevated temperatures and pressure in the presence of a catalyst, such as Raney nickel, yielding the desired 4-piperidinol. Thus 1,2,6-trimethyl-4-piperidinol is prepared by reacting 2,6-dimethyl γ-pyrone with methylamine and catalytically reducing the pyridone with hydrogen. This method is applicable to the preparation of 1-benzyl-4-piperidinol by using ammonia in place of the methylamine and after reduction, the 4-hydroxypiperidine is alkylated with benzyl chloride.

Instead of utilizing the γ-pyrones or ring closure procedures, the piperidinols may be prepared from pyridine compounds. For example, reduction of 2-methyl-5-nitropyridine with hydrogen in the presence of a catalyst such as platinum oxide, affords 2-methyl-5-aminopyridine which, upon diazotization and hydrolysis, results in the formation of 2-methyl-5-pyridol. Quaternization of the pyridol with dimethyl sulfate, for example, followed by reduction with hydrogen in the presence of platinum oxide yields 1,2-dimethyl-5-hydroxy-piperidine.

Alternatively, 2-methyl-5-pyridol may be reduced at elevated temperatures and pressures using Raney nickel catalyst and the resultant hydroxypiperidine alkylated to suit. For example, if the N-methylated compound is desired, formaldehyde and formic acid may conveniently be employed to give 1,2-dimethyl-5-piperidinol. It is apparent to one skilled in the art that various modifications of such procedures may be employed to prepare intermediates used in this invention.

To prepare compounds of general Formula I wherein X is sulfur, the corresponding thiopiperidine may be employed. The intermediate thiopiperidines are preferably obtained from the reaction of a piperidinol with an agent such as phosphorous pentasulfide. The purified thiols are then subjected to the same type of reaction as their oxygen analogs. For example, heating an intimate mixture of 1,2,6-trimethyl-4-piperidinol and phosphorous pentasulfide followed by distillation after the excess sulfurizing agent is destroyed, affords the corresponding 1,2,6-trimethyl-4-thiopiperidine.

The non-toxic acid addition salts of the basic ethers and thioethers of general Formula I are prepared by reacting the basic ether or thioether directly with an acid in the usual manner, preferably in the presence of a solvent. For example, by passing anhydrous hydrogen chloride through an ether solution of 1,2,2,6-tetramethyl-4-piperidinol, there precipitates the corresponding hydrochloride which may be recrystallized from alcohol-ether. Similarly by heating the aforementioned base with an equivalent of maleic acid in isopropyl acetate, for instance, the corresponding maleic acid salt is obtained upon cooling. Examples of non-toxic anions which may be employed are chloride, bromide, maleate, tartrate, citrate and the like.

The quaternary salts of the free bases of this invention may be prepared by reacting the base with an alkyl halide or sulfate such as methyl bromide and the like, optionally in the presence of an inert solvent. Alternatively, quaternary chlorides and bromides may be prepared from the corresponding iodides by heating an alcoholic solution of the iodide in the presence of a silver halide whereupon halogen exchange is effected.

The compounds of the present invention may be administered in a variety of pharmaceutical forms such as tablets, capsules, elixers and the like. They may be dissolved or suspended in non-toxic vehicles which may be flavored to suit so as to make the medicament palatable.

The following examples illustrate the preparation of the compounds of this invention, but do not limit invention except as defined in the appended claims.

EXAMPLE I

*1,2,2,6-tetramethyl-4-piperidyl benzhydryl ether*

A mixture of 24.0 g. of 1,2,2,6-tetramethyl-4-piperidinol, 11 g. of anhydrous potassium carbonate, 37 g. of benzhydryl bromide in 100 ml. of xylene is stirred and refluxed overnight. After cooling, the mixture is poured into water and extracted with ether. The ether solution is extracted with dilute aqueous hydrochloric acid and the acid solution, after treatment with dilute sodium hydroxide solution, is extracted with ether. The ether solution is washed with water, dried over anhydrous potassium carbonate, concentrated in vacuo and distilled to yield 1,2,2,6-tetramethyl-4-piperidyl benzhydryl ether, B. P. 178–180°/3–4 mm.

EXAMPLE II

*1,2,2,6-tetramethyl-4-piperidyl benzhydryl ether methiodide*

A solution of 7 g. of the amino-ether of Example I, 25 g. of methyl iodide and 100 ml. of anhydrous ether is refluxed for 3 hours and allowed to stand overnight. The mixture is cooled, filtered and the crystals so obtained recrystallized from aqueous alcohol, yielding 1,2,2,6-tetramethyl-4-piperidyl benzhydryl ether methiodide, M. P. 260.8–261°.

EXAMPLE III

*1,2,2,6-tetramethyl-4-piperidyl benzhydryl ether maleate*

A solution of 6.4 g. of the amino-ether obtained in Example I, in 25 ml. of isopropyl acetate is added to a solution of 2.3 g. of maleic acid, in 25 ml. of isopropyl acetate. The resulting mixture is warmed on a steam bath and, upon cooling, crystallization of the salt occurs. The maleate salt is removed by filtration and dried, M. P. 150–151°, recrystallizable from isopropyl acetate.

EXAMPLE IV

*1,2,2,6-tetramethyl-4-piperidyl benzhydryl ether methbromide*

The requisite intermediate, silver bromide, is freshly prepared as follows:

A solution of 0.05 mole of silver nitrate in 100 ml. of water is treated with a slight excess of aqueous hydrobromic acid. The resultant mixture is warmed until the precipitate coagulates. The silver bromide is removed by filtration and washed thoroughly with water and then with methanol, keeping the salt moist throughout the operation.

To a stirred suspension of the freshly prepared silver bromide, in 300 ml. of anhydrous methanol, is added a solution of 0.03 mole of the quaternary iodide obtained in Example II. The mixture is stirred and refluxed overnight whereupon, after cooling, the suspended salts are removed by filtration. Evaporation of the methanolic solution followed by recrystallization of the residue from methanol-ether yields the quaternary bromide of this example.

EXAMPLE V

*1,2,2,6-tetramethyl-4-piperidyl p-chlorobenzhydryl ether*

To a stirred mixture of 23.7 g. of 1,2,2,6-tetramethyl-4-piperidinol, 11 g. of anhydrous potassium carbonate in 100 ml. of xylene, is slowly added a solution of 42 g. of p-chlorobenzhydryl bromide in 50 ml. of xylene. The reaction mixture is processed as described in Example I, yielding 1,2,2,6-tetramethyl-4-piperidyl p-chlorobenzhydryl ether, B. P. 193°/1 mm.

EXAMPLE VI

*1,2,2,6-tetramethyl-4-piperidyl p-chlorobenzhydryl methiodide*

A solution of 8 g. of the amino ether of Example V, 20 ml. of methyl iodide, 50 ml. of anhydrous ether is refluxed for 3 hours and allowed to stand overnight. The quaternary salt which precipitates is removed by filtration and recrystallized from aqueous-ethanol, M. P. 238–239.4°.

EXAMPLE VII

*1,2,6-trimethyl-4-piperidyl α,α-diphenylethyl ether*

From the reaction of 1,2,6-trimethyl-4-piperidinol and 1,1-diphenylethyl bromide, according to the procedure of Example I, there is obtained 1,2,6-trimethyl-4-piperidyl α,α-diphenylethyl ether, B. P. 175–180°/3 mm.

EXAMPLE VIII

*1,2,2,6-tetramethyl-4-piperidyl p-methylbenzhydryl ether*

By substituting p-methylbenzhydryl bromide in the procedure described in Example V, there is obtained 1,2,2,6-tetramethyl-4-piperidyl p-methylbenzhydryl ether, B. P. 190–195°/2 mm.

EXAMPLE IX

*1,6-dimethyl-3-piperidyl benzhydryl ether*

By treating 1,6-dimethyl-3-piperidinol with benzhydryl bromide according to the procedure of Example I, there is obtained 1,6-dimethyl-3-piperidyl benzhydryl ether, B. P. 170–172°/1 mm.

EXAMPLE X

*1,6-dimethyl-3-piperidyl benzhydryl ether methiodide*

From the reaction of the amino-ether of Example IX with methyl iodide according to the procedure of Example II, there is obtained 1,6-dimethyl-3-piperidyl benzhydryl ether methiodide.

EXAMPLE XI

*1,2,6-trimethyl-3-piperidyl benzhydryl ether*

By reacting equimolar quantities of 1,2,6-trimethyl-3-piperidinol with benzhydryl bromide according to the procedure of Example I, there is obtained 1,2,6-trimethyl-3-piperidyl benzhydryl ether, B. P. 180°/1 mm.

EXAMPLE XII

*1,2,6-trimethyl-3-piperidyl benzhydryl ether methiodide*

By substituting the amino-ether of Example XI in the procedure described in Example II, there is obtained 1,2,6-trimethyl-3-piperidyl benzhydryl ether methiodide, M. P. 272.5–273.5.

EXAMPLE XIII

*1,2,6-trimethyl-4-piperidyl benzhydryl thioether*

The requisite intermediate, 1,2,6-trimethyl-4-thiopiperidine is prepared as follows:

An intimate mixture of equimolar quantities of 1,2,6- trimethyl-4-piperidinol and phosphorous pentasulfide is heated at 150–200° for several hours. After cooling, the mixture is decomposed with dilute hydrochloric acid and then made alkaline with sodium hydroxide solution. The alkaline mixture is extracted with ether which is dried and distilled in vacuo yielding 1,2,6-trimethyl-4-thiopiperidine.

By reacting the above obtained thiopiperidine with an equimolar quantity of benzhydryl bromide according to the procedure of Example I, there is obtained 1,2,6-trimethyl-4-piperidyl benzhydryl thioether, B. P. 192–197°/1 mm.

EXAMPLE XIV

1,2,6-trimethyl-4-piperidyl benzhydryl ether

From the reaction of 21.5 g. of 1,2,6-trimethyl-4-piperidinol, 11 g. of anhydrous potassium carbonate, 37 g. of benzhydryl bromide in 150 ml. of anhydrous xylene according to the procedure of Example I, there is obtained the ether of this example, B. P. 186–191°/3–4 mm.

EXAMPLE XV

1,2,2,6-tetramethyl-4-piperidyl p-methylbenzhydryl ether

From the reaction of 23.7 g. of 1,2,2,6-tetramethyl-4-piperdinol, 11 g. of anhydrous potassium carbonate, 39.1 g. of p-methylbenzhydryl in 150 ml. of anhydrous xylene according to the procedure of Example I, there is obtained the above-entitled ether as a clear viscous oil, B. P. 211–212°/3–4 mm.

EXAMPLE XVI

1,2,2,6-tetramethyl-4-piperidyl pp'-dichlorobenzhydryl ether

By substituting pp'-dichlorobenzhydryl bromide in the procedure described in Example I, there is obtained the above-entitled dichlorobenzhydryl ether, B. P. 225–230°/1 mm.

EXAMPLE XVII

1,2,6-trimethyl-3-piperidyl pp'-dimethylbenzhydryl ether

By reacting equimolar quantities of 1,2,6-trimethyl-3-piperidinol with pp'-dimethylbenzhydryl bromide according to the procedure of Example I, there is obtained the compound of this example, B. P. 210–215°/0.5 mm.

EXAMPLE XVIII

1,2,6-trimethyl-4-piperidyl pp'-dimethoxybenzhydryl ether

From the reaction of 1,2,6-trimethyl-4-piperidinol with pp'-dimethoxybenzhydryl bromide according to the procedure of Example I, there is obtained 1,2,6-trimethyl-4-piperidyl pp'-dimethoxybenzhydryl ether, B. P. 240–245°/0.5 mm.

EXAMPLE XIX

1-ethyl-2,6-dimethyl-4-piperidyl benzhydryl ether

By reacting equimolar quantities of 1-ethyl-2,6-dimethyl-4-piperidinol with benzhydryl bromide according to the procedure of Example I, there is obtained 1-ethyl-2,6-dimethyl-4-piperidyl benzhydryl ether, B. P. 185–190°/3–4 mm.

EXAMPLE XX

1-benzyl-2,6-dimethyl-4-piperidyl benzhydryl ether

From the reaction of equimolar quantities of 1-benzyl-2,6-dimethyl-4-piperidinol and benzhydryl bromide according to the procedure of Example I, there is obtained the above-entitled ether.

In all of the foregoing examples, the benzhydryl ethers were prepared by the reaction of a benzhydryl halide with a piperidinol or piperidine thiol in the presence of an alkali metal carbonate condensing agent. Other types of acid acceptors such as potassium hydroxide and sodium hydroxide may be used. In addition to the foregoing, the following examples show alternate methods of preparing the compounds of this invention.

EXAMPLE XXI

1,2,6-trimethyl-3-piperidyl m-bromobenzhydryl ether

To a suspension of 0.1 mole of sodamide in 500 ml. of anhydrous toluene is added a solution of 0.1 mole of m-bromobenzhydrol in toluene. The mixture is refluxed for several hours, after which time a solution of 0.1 mole of 1,2,6-trimethyl-3-chloropiperidine (prepared according to the procedure of Fuson and Zirkle, J. A. C. S. 70, 2760 (1948) is slowly added. The reaction mixture is refluxed for an additional 4 hours and, after cooling, is poured into ice-water and extracted with ether. Following the isolation procedure of Example I, there is obtained the bromobenzhydryl ether of this example, B. P. 190–195°/1 mm.

Alternatively, the compound of this example is prepared from m-brombenzhydryl bromide and 1,2,6-trimethyl-3-piperidinol, according to the procedure of Example I.

EXAMPLE XXII

1,2,6-trimethyl-4-piperidyl p-methyl-p¹-chlorobenzhydryl ether

A mixture of 0.1 mole of potassium hydroxide in toluene is distilled until all of the water is removed azeotropically. To the stirred, refluxing mixture is added 0.1 mole of m-methyl-m-chlorobenzhydrol and the resulting mixture refluxed for several hours, at which time 0.1 mole of 1,2,6-trimethyl-4-chlorpiperidine in anhydrous toluene is added slowly and the reaction mixture is refluxed overnight. The mixture is cooled, poured into ice-water and extracted with ether and, following the isolation procedure of Example I, the benzhydryl ether of this example is obtained as a viscous oil, B. P. 230–235°/0.5 mm.

Alternatively, the compound of this example is prepared from m-methyl-m¹-chlorobenzhydryl bromide and 1,2,6-trimethyl-4-piperidinol, following the procedure of Example I.

EXAMPLE XXIII

1,2,6-trimethyl-4-piperidyl α-p-tolyl-α-phenylethyl ether

To a suspension of 0.1 atom of powdered sodium in 100 ml. of anhydrous toluene is slowly added a solution of 0.1 mole of 1,2,6-trimethyl-4-piperidinol in 100 ml. of anhydrous toluene. The mixture is stirred and refluxed for several hours until the amino alcohol is completely converted to its sodium salt. To the cooled, stirred suspension of the sodio derivative there is slowly added a solution of 0.1 mole of α-p-tolyl-α-phenylethyl bromide. The resulting mixture is refluxed for several hours and, after cooling is poured into ice-water and extracted with ether. The ether solution is extracted with dilute aqueous hydrochloric acid and the acid solution is made alkaline with dilute sodium hydroxide solution. The aqueous alkaline mixture is extracted with ether and the ether extracts dried with anhydrous potassium carbonate, concentrated in vacuo, and distilled to yield the compound of this example, B. P. 180–185°/1 mm.

We claim:

1. Compounds of the group consisting of bases of the general formula:

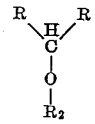

wherein R is a member of the group consisting of phenyl, mono-chlorophenyl, mono-bromophenyl, mono-methylphenyl and mono-methoxyphenyl radicals; and $R_2$ is a member of the group consisting 1,2,6-trimethyl-3-piperidyl, 1,2,6-trimethyl-4-piperidyl, and 1,2,2,6-tetramethyl-4-piperidyl radicals, and the non-toxic acid addition and quaternary salts thereof.

2. 1,2,2,6-tetramethyl-4-piperidyl benzhydryl ether.
3. 1,2,2,6-tetramethyl-4-piperidyl p-chlorobenzhydryl ether.
4. 1,2,2,6-tetramethyl-4-piperidyl p-methylbenzhydryl ether.
5. 1,2,6 - trimethyl-3-piperidyl p,p$^1$-dimethylbenzhydryl ether.

References Cited in the file of this patent

UNITED STATES PATENTS

| | | |
|---|---|---|
| 2,454,092 | Rieveschl, Jr. | Nov. 16, 1948 |
| 2,479,843 | Knox | Aug. 23, 1949 |